May 25, 1926.  1,586,461
F. PADOVANI
LIFE GUARD FOR MOTOR VEHICLES
Filed July 17, 1925  4 Sheets-Sheet 1
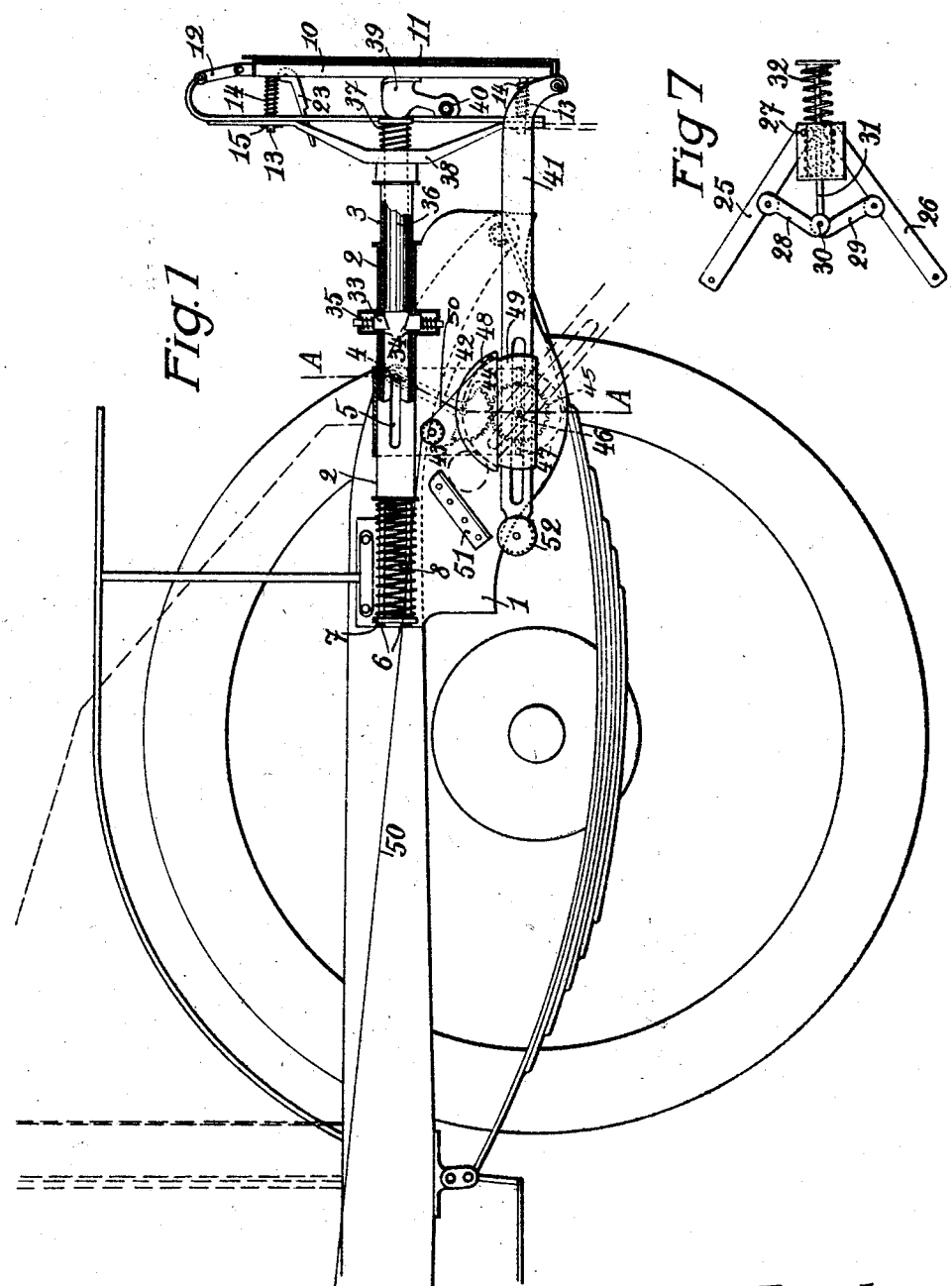
Inventor
Francois Padovani May 25, 1926.
F. PADOVANI
1,586,461
LIFE GUARD FOR MOTOR VEHICLES
Filed July 17, 1925
4 Sheets-Sheet 2
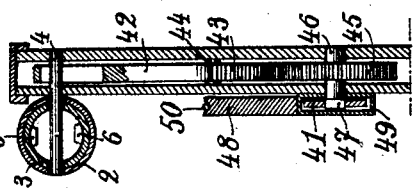
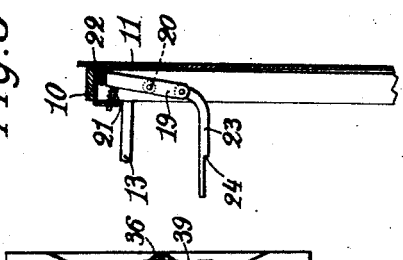
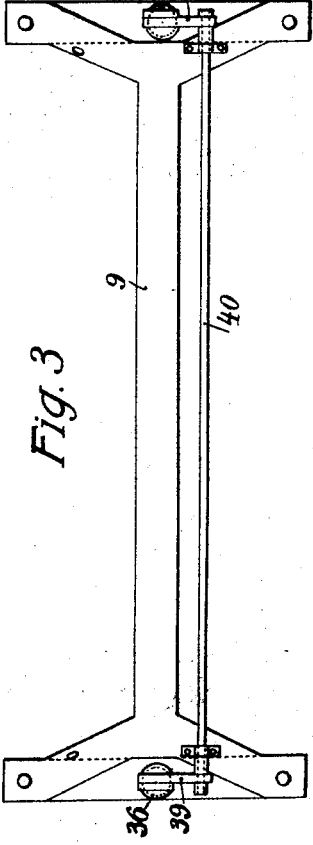
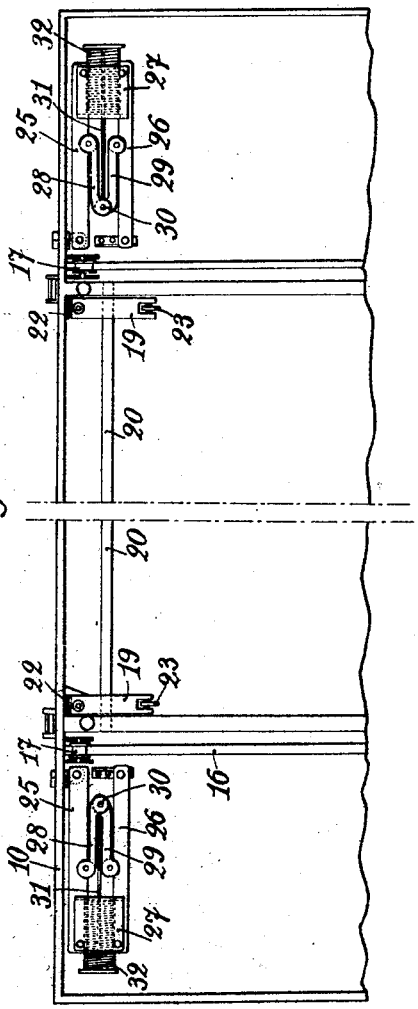
Inventor
François Padovani
by H. B. Willson & Co.
Attorneys

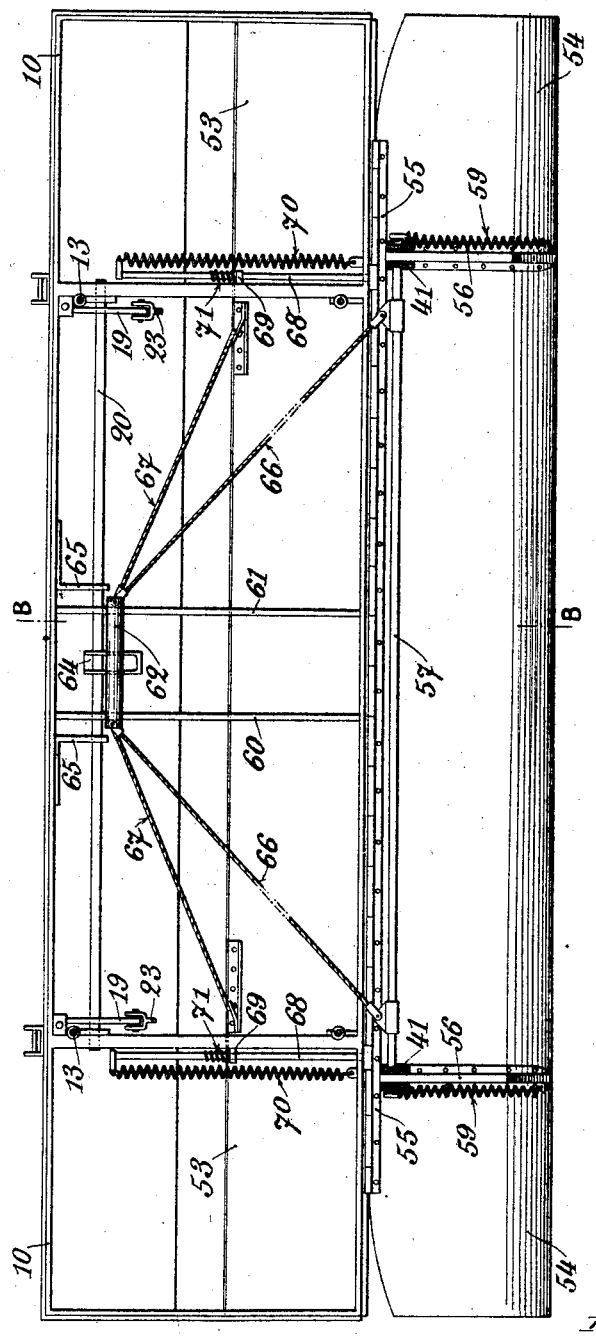

May 25, 1926.
F. PADOVANI
1,586,461
LIFE GUARD FOR MOTOR VEHICLES
Filed July 17, 1925      4 Sheets-Sheet 4
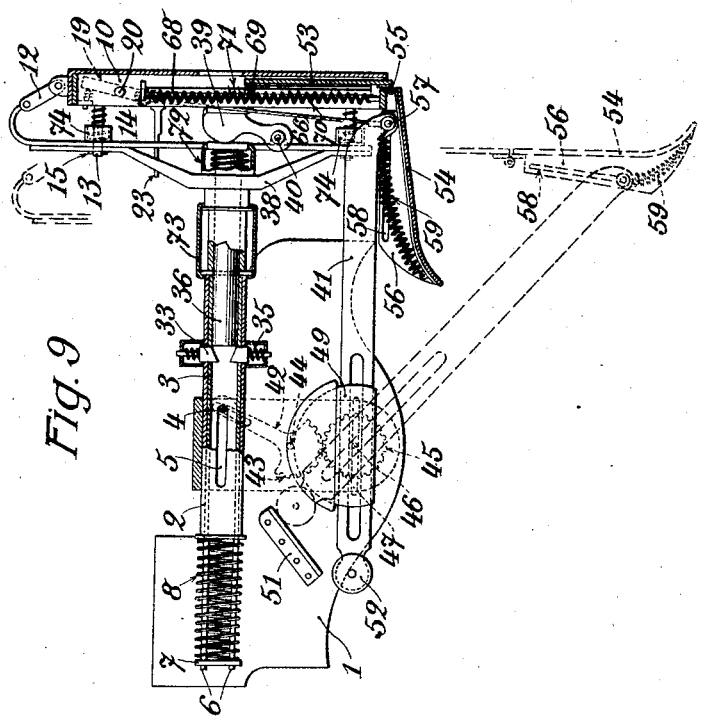
Inventor:-
Francois Padovani,
by H. B. Willson & Co
Attorneys Patented May 25, 1926.

1,586,461

UNITED STATES PATENT OFFICE.

FRANÇOIS PADOVANI, OF PARIS, FRANCE.

LIFE GUARD FOR MOTOR VEHICLES.

Application filed July 17, 1925, Serial No. 44,352, and in France July 26, 1924.

The present invention relates to a life-guard for motor vehicles, which upon striking an obstacle will automatically effect the braking and the stopping of the vehicle.

The said life-guard comprises, for example, a suitable flap which is suspended across the front of the vehicle in such manner that it will be disengaged by the shock against the obstacle and will descend to the level of the ground under the action of springs, thus preventing the person from being run over by the wheels. At the same time, the shock will disengage an elastic device which acts through the medium of suitable rod and link gear upon the unclutching means, the brakes, or like devices for stopping the vehicle.

In this manner, I obviate all danger of running over the person by the vehicle, and all serious accidents, due to the automatic and rapid stopping of the vehicle.

The appended drawing shows by way of example various embodiments of the invention.

Fig. 1 is a side view of the device, and,

Fig. 2 a partial section on the line A—A of Fig. 1.

Fig. 3 is a front view of the shutter support.

Fig. 4 is a rear view of the flap, and

Fig. 5 a side view showing the arrangement for securing the same.

Fig. 6 shows the guiding means for the said flap, and,

Fig. 7 the control of the descent of the flap.

Fig. 8 is a rear elevational view of a second embodiment in which the flap consists of two pivoted parts. This figure shows the life-guard before the descent of the upper part of the said flap, the lower part being supposed to be no longer retained by the supporting cable.

Fig. 9 is a cross section in the folded position, adjacent the end of the flap.

Fig. 10 is a cross section on the line B—B of Fig. 8.

The apparatus as a whole is mounted upon two plates 1 which are disposed at each side of the front of the vehicle and are secured to the sleeves 2. In the said sleeves are slidable the tubes 3 which are guided by the axles 4, engaged in the guides 5.

To the rear end of the tubes 3 are secured the rods 6 which are connected together by a washer (provided with a pin) 7 by which they are caused to bear upon the springs 8 which abut against the rear end of the sleeves 2. On the front end of the tubes 3 are mounted the forks 38 which are connected together by a cross-bar 9 and which support a frame 10 in contact with the flap 11.

The said frame is suspended from the supports 12, for example, and it comprises four rods 13 which are slidable in the forks 38 against the action of the springs 14; said rods are provided at the ends with an abutment consisting for example of the pins 15.

The frame 10 comprises the vertical guide rods 16 upon which the flap 11 is slidable; to this effect, the said flap is provided with the rollers 17 (Fig. 6) which are adapted to roll upon the said rods. To the frame 10 are pivoted two arms 19 (Fig. 5) which are connected together by a transverse rod 20; said arms are urged by the springs 21 into a position forwardly of the frame 10, and will thus support the said flap through the medium of the projections 22 provided upon the said flap. Upon the other end of the arms 19 are pivoted the members 23 which are provided with an abutment 24 and are engaged in slots in the frame 10.

When the flap which is mounted on the arms 19 receives a shock, the frame 10 will recede, thus compressing the springs 14, and since the members 23 are in contact with the said frame, the arms will pivot about and will thus release the projections 22, so that the said flap will be no longer supported and will now descend.

To accelerate this motion, I dispose upon the frame 10, and on each side of the latter, suitable elements of compass shape consisting of two branches 25 and 26 which are pivoted at one end to a holder 27.

On the other hand, the branch 25 is pivoted to the frame 10, and the branch 26 to the flap 11. To the branches 25 and 26 are pivoted the respective arms 28 and 29 which are connected together by an axle 30 to which is secured the rod 31, urged by a spring 32 which abuts against the holder 27.

When the flap 11 is released, the compass elements will tend to spread apart under the action of the springs 32 and hence to permit the descent of the said flap.

When the flap is in the raised position, the tubes 3 are maintained in the front position, against the springs 8, by the triggers 33 engaged in the slots 34 formed in the said tubes, said triggers are mounted on the sleeves 2 and are slidable in the slots in said sleeves, against the action of the springs 35.

In the tubes 3 are slidable the tubes 36 which are urged forwardly by the springs 37. The levers 39 are pivoted to the forks 38 and are connected together by a cross-bar 40; when the said levers are pushed to the rear by the frame 10 they will bear upon the ends of the tubes 36, and this will engage the said tubes below the triggers 34 against which they are caused to bear.

When the said triggers are raised, the tubes 3 will no longer be retained, and will be brought to the rear by the action of the springs 8. This motion is utilized for the control of the braking devices of the vehicle as well as for the descent of the said flap. For this purpose, the arms 41 are pivoted at each side to the lower part of the flap 11, and are brought into the position represented in the dot and dash lines in Fig. 1, in the following manner:

To each axis of the tubes 3 is pivoted— by a suitable slot—an arm 42 secured to a toothed sector 43 which is pivoted on an axle 44 disposed at the centre of the said sector; the sector is in gear engagement with a pinion 45 keyed to a shaft 46 which is journalled in the plate 1.

The said axis terminates in a T shaped portion 47 which is slidable in a longitudinal slot in the arms 41. A semicircular member 48 having at its centre the shaft 46 is secured to a sleeve 49 in which the arm 41 is slidable; said member has at the periphery a groove containing a cable 50 which is attached to the said member.

In these conditions, when the tubes 3 are brought to the rear, the arms 42 will pivot upon the axes 44, and the sectors 43 will rotate the pinions 45. The axes 44 will actuate the arms 41 by means of their parts 47 and will thus turn the said arms into the position shown in the dot and dash lines. To guide the said arms in their movement, the abutments 51 are disposed upon the plates 1, and the said arms will bear upon said abutments by means of the rollers 52. Obviously, the said abutments are so disposed that the flap 11 may descend vertically. At the same time, the cable 50 is wound on the semicircular member 48 and may actuate any suitable control.

When the apparatus has thus operated, it may be put in place either by raising the flap 11 by hand, or by acting on the cables 50 by means of any one of the levers 39, in the contrary direction.

In the modification shown in Figs. 8 to 10, the said flap comprises a flat upper part 53 which is vertically slidable in guides formed in the frame 10, and also a lower part 54 which is pivoted to the said upper part by the horizontal hinge 55. The part 54 is preferably curved towards the front (Fig. 9) so as to fit more closely upon the obstacle; it is provided with the brackets 56 which are connected together by the transverse rod 57, slidable in the slots 58 against the springs 59. The frame 10 carries at the middle part the vertical transverse members 60 and 61 upon which is slidable the handle 62; the latter is slotted in such manner as to form a notch 63 co-operating with a pawl 64 mounted on the rod 20. Said rod is preferably maintained by the two supports 65, to prevent it from bending. The two parts of the said flap are connected with said handle by the respective cables 66 and 67.

In these conditions, when the said handle is raised and engages the pawl 64, the elements will assume the position shown in Fig. 9, wherein the part 53 is raised within the frame 10 and the part 54 is withdrawn in the horizontal direction to the rear. The levers 41 have suitable forks at the ends, and are mounted by the said forks upon the brackets 56; the rod 57 is engaged with the said levers. In order to accelerate the descent of the said flap, the vertical rods 68 are secured to the lower part of the portion 53 and are guided in the said frame and in the lugs 69 against the action of the springs 70. Suitable shock absorbing springs 71 are preferably interposed between the ends of the rods 68 and the lugs 69.

In these conditions, when any part of the surface of the frame 10 is subjected to the pressure of an obstacle, the device is released as above set forth, and the handle 62 is disengaged. The part 53 of the flap will abruptly descend upon the ground, in the vertical direction, whilst the part 54 under the action of the levers 41 and the springs 59 will be brought down in the vertical position.

By reason of the curved shape of the end of the part 54, the person's body which has fallen will be slightly raised, and the body will not be jammed upon the ground. To return the device as a whole into the inoperative position, the operator seizes the handle 62 and raises it until it becomes engaged with the pawl 64. To avoid all abrasion of the tubes 3 and 36 due to the effect of dust or the like, I prefer to employ the elastic sheaths 72 and 73. In order to obviate the complete flattening of the springs 14 and 37, I may dispose suitable abutments 74 adjacent the springs 14.

Having thus described my apparatus, what I claim as new therein, and my own invention, is—

1. A life guard for motor vehicles, comprising a support disposed at the front of the vehicle and slidable lengthwise of the vehicle, elastic means for bringing back the said support to the rear, fastening means for maintaining the support in the forward position a frame suspended from said support and pivoting in the lengthwise direction, means for releasing the said fastening means by the rearward displacement of the said frame, a flap which is vertically slidable upon the said frame, a device for securing the said flap to the support, means for releasing the said device by the rearward displacement of the said flap, means controlled by the rearward motion of the support and adapted to draw down the said flap, and means controlled by the same rearward motion and acting upon a device for braking the vehicle.

2. A life-guard for motor vehicles, comprising a support disposed at the front of the vehicle and slidable lengthwise of the vehicle, elastic means for bringing back the said support to the rear, fastening means for maintaining the support in the forward position, a frame suspended from said support and pivoting in the lengthwise direction, means for releasing the said fastening means by the rearward displacement of the said frame, a flap which is vertically slidable upon the said frame, a device for securing the said flap to the support, means for releasing the said device by the rearward displacement of the said flap, arms guided upon the vehicle and pivoted to the said flap, means for connecting the support to the said arms whereby the ends of said arms will be lowered by the rearward motion of the support, and means controlled by the said motion and acting upon a device for braking the vehicle.

3. A life-guard for motor vehicles, comprising a support disposed at the front of the vehicle and slidable lengthwise of the vehicle, elastic means for bringing back the said support to the rear, fastening means for maintaining the support in the forward position, a frame suspended from said support and pivoting in the lengthwise direction, means for releasing the said fastening means by the rearward displacement of the said frame, a device for securing the said flap to the support, means for releasing the said device by the rearward displacement of the said flap, arms guided upon the vehicle and pivoted to the said flap, guides upon which the said arms may be moved lengthwise, shafts secured to said guides and journaled on the vehicle, pinions keyed to the said shafts, arms pivoted to said support, sectors mounted on the said arms and in gear engagement with said pinions, sleeves in which arms pivoted to the flap are slidable, grooved pulleys mounted on the said sleeves, and cables attached to said pulleys and connected with the rod and link gear of the brake.

In testimony whereof I have hereunto affixed my signature.

FRANÇOIS PADOVANI.